Dec. 16, 1958  H. C. SCHINDLER  2,864,479
TRANSMISSION-HYDRAULIC CLUTCH BLEED-OFF VALVE
Filed Jan. 17, 1955  3 Sheets-Sheet 1

INVENTOR.
HAROLD C. SCHINDLER
BY
Hyde, Meyer, Baldwin & Doran
ATTORNEYS

Dec. 16, 1958  H. C. SCHINDLER  2,864,479
TRANSMISSION-HYDRAULIC CLUTCH BLEED-OFF VALVE
Filed Jan. 17, 1955  3 Sheets-Sheet 2

INVENTOR.
HAROLD C. SCHINDLER
BY
Hyde, Meyer, Baldwin & Doran
ATTORNEYS

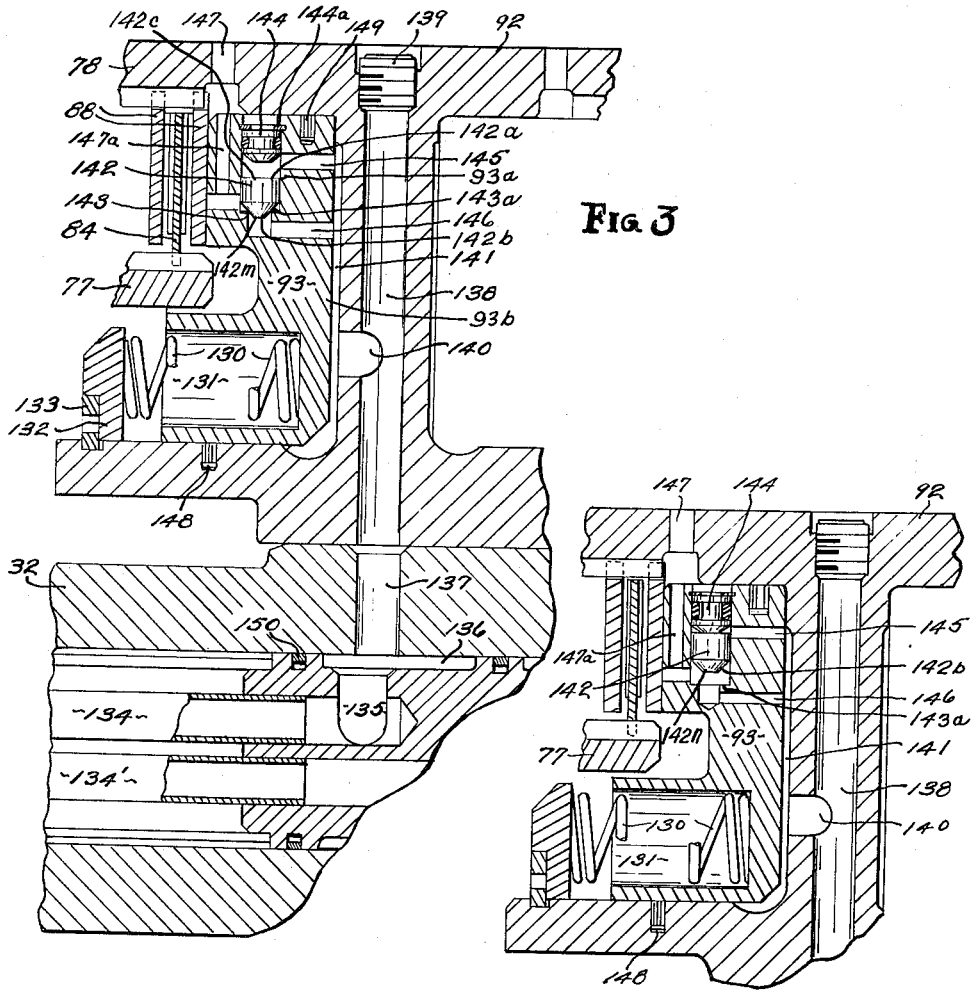

United States Patent Office 2,864,479
Patented Dec. 16, 1958

2,864,479

TRANSMISSION-HYDRAULIC CLUTCH BLEED-OFF VALVE

Harold C. Schindler, Euclid, Ohio, assignor to General Motors Corporation, Detroit, Mich., a corporation of Delaware Application January 17, 1955, Serial No. 482,257

5 Claims. (Cl. 192—85)

This invention relates to improvements in a clutch utilized in connection with change of gear ratios in a transmission wherein the clutches are operated by hydraulic fluid, and more particularly to a bleed-off valve for quickly releasing the hydraulic fluid holding a clutch engaged.

The clutch construction of this application may be utilized in the transmission disclosed in the copending application of Walter F. Double et al., Serial No. 426,114, filed April 28, 1954, and issued November 15, 1955, as U. S. Patent No. 2,723,567, although it has other uses also.

It is an object of the present invention to provide in the combination of a hydraulic clutch operable into clutch engaging position by hydraulic fluid supplied to one side of a movable abutment, a means for bleeding off the hydraulic fluid quickly after the supply of fluid is cut off from the pump.

Another object of the present invention is to provide hydraulic fluid bleed-off means as mentioned in the preceding paragraph, comprising a reciprocatable valve movable radially outwardly under centrifugal force when the parts are rotating by a force greater than the centrifugal force effective upon the column of hydraulic fluid which normally holds the valve on its seat when the parts are rotating and the pump is operating.

Still a further object of the present invention is the provision of a poppet valve acting as a bleed-off valve in a hydraulic clutch as above described, wherein the hydraulic fluid supplied to the movable abutment for holding the clutch engaged has a preponderating effect on the radially outermost face of the poppet valve to hold it closed when the parts are rotating and the hydraulic fluid supply pump is operating. Then, when the pump supply is cut off, in the shifting of gear ratios, the centrifugal force acting upon the poppet valve to urge it radially outwardly, away from its seat, is sufficient to overcome the centrifugal force acting on the column of hydraulic fluid under the action of the rotating parts so as to permit the poppet valve to open communication with an hydraulic fluid discharge passageway.

Other objects and advantages of the invention will be disclosed in connection with the specification and drawings and the essential features thereof will be set forth in the appended claims.

In the drawings,

Fig. 2 is an enlarged detail section view of that portion of Fig. 1 enclosed in dot-dash lines, the view of Fig. 2 being taken along a plane passing axially through shaft 32 of Fig. 1; while Figs. 3 and 4 are fragmental sectional views, enlarged, of the upper central portion of Fig. 2 showing the bleed-off valve in closed and open position respectively.

Figure 1:
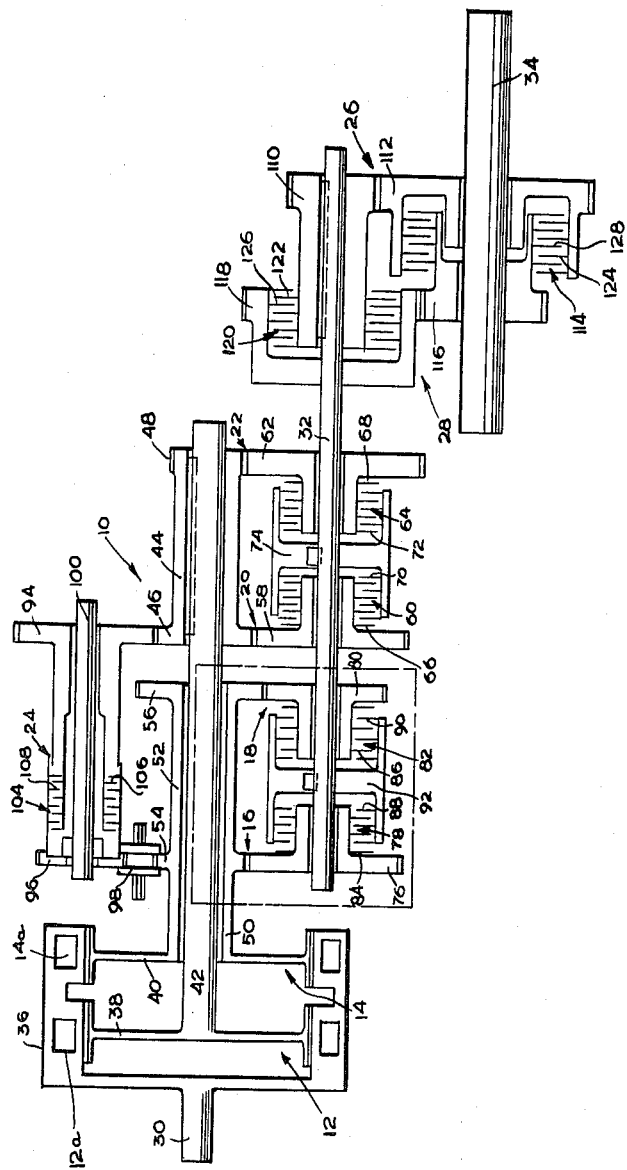
Fig. 1 is a diagrammatic view indicating a ladder-type transmission in which the present invention is adapted to be used.

Referring to Fig. 1 of the drawings, 10 represents generally a multiple forward and reverse speed transmission comprising basically a pair of main power input clutches 12 and 14, gear sets 16, 18, 20 and 22, reverse gear cluster 24, auxiliary gear sets 26 and 28, and input, intermediate and output shafts 30, 32 and 34 respectively.

Input shaft 30 has affixed thereto a drum member 36 constituting an input or driving member of both clutches 12 and 14.

Clutches 12 and 14 are preferably of the eddy current electromagnetic type and comprise in addition to the input member 36, rotor or output members 38 and 40 respectively. Output member 38 includes an output shaft 42 having a gear cluster 44 fixedly secured thereon, comprising axially spaced gears 46 and 48 whereas output member 40 includes a quill shaft 50, encircling shaft 42, having a gear cluster 52 thereon, comprising axially spaced gears 54 and 56.

Gear 46 constituting a part of gear set 20 meshes with a gear 58, forming the other part thereof, and gear 58 is in turn adapted to be coupled to intermediate shaft 32 by way of a friction clutch 60. Gear 48, of gear cluster 44, constituting a part of gear set 22 meshes with a gear 62, forming the other part thereof, and gear 62 is in turn adapted to be coupled to intermediate shaft 32 by way of a friction clutch 64. Both clutches 60 and 64 as shown are of the multiple plate type and include respectively input plates 66 and 68 connected to the respective gears 58 and 62, and output plates 70 and 72 respectively connected to a common support 74 having keyed relation with intermediate shaft 32.

Gear 54 constituting a part of gear set 16, meshes with a gear 76, forming the other part thereof, and gear 76 is in turn adapted to be coupled to intermediate shaft 32 by way of a friction clutch 78. Gear 56, of gear cluster 52, constituting a part of gear set 18, meshes with a gear 80, forming the other part thereof, and gear 80 is in turn adapted to be coupled to intermediate shaft 32 by way of a friction clutch 82. Both clutches 78 and 82 are identical to clutches 60 and 64 and include input plates 84 and 86 connected to the respective gears 76 and 80, and output plates 88 and 90 respectively connected to a common support 92 having keyed relation with intermediate shaft 32.

Reverse gear cluster 24 includes a gear 94 having meshing relation with gear 46 and gear 96 having meshing relation with a reverse idler gear 98, said idler gear in turn meshing with gear 54 of gear cluster 52. Gears 94 and 96 are supported for rotation on jack shaft 100 and are adapted to be coupled together by a friction clutch 104. The clutch 104 includes engageable plates 106 and 108 connected respectively to the gears 94 and 96.

Auxiliary gear sets 26 and 28 as combined constitute an auxiliary gear box for transmission 10.

Friction clutches 60, 64, 78, 82, 104, 114 and 120 can be actuated by any of several conventional means, such as hydraulically, by vacuum, or electricity; hydraulic operation under electrical control being hereinafter described.

For the purpose of achieving eight forward as well as eight reverse speeds the gears are required to be predetermined as to size, for example wherein meshing gears 54 and 76 are provided with 26 and 46 teeth respectively, meshing gears 56 and 80 are provided with 39 and 33 teeth respectively, meshing gears 46 and 58 are provided with 32 and 40 teeth respectively, meshing gears 48 and 62 are provided with 20 and 52 teeth respectively, meshing gears 110 and 112 are provided with 24 and 79 teeth respectively, meshing gears 118 and 116 are provided with 59 and 44 teeth respectively, reverse gear 96 is provided with 32 teeth and reverse gear 94 is provided with 40 teeth.

The first forward speed of the transmission is obtained through an energization of clutch 12, engagement of clutch 64 and engagement of clutch 114 such that power flows by way of clutch 12, output member 38, shaft 42, gear cluster 44, meshing gears 48 and 62, engageable plates 66 and 72 of clutch 64, member 74, shaft 32, meshing gears 110 and 112, engageable plates 124 and 128 of clutch 114, gear 116 and output shaft 34. Second forward speed is next obtained by de-energizing clutch 12, simultaneously energizing clutch 14, disengaging clutch 64, simultaneously engaging clutch 78, and maintaining clutch 114 engaged whereby power flows from clutch 14, output member 40, shaft 50, gear cluster 52, meshing gears 54 and 76, clutch 78, shaft 32, meshing gears 110 and 112, clutch 114, gear 116 and shaft 34.

A third forward speed is achieved upon the de-energization of clutch 14, simultaneous energization of clutch 12, disengagement of clutch 78, simultaneous engagement of clutch 60 and maintenance of clutch 114 engaged whereby power flows by way of clutch 12, output member 38, shaft 42, gear cluster 44, meshing gears 46 and 58, clutch 60, shaft 32, meshing gears 110 and 112, clutch 114, gear 116, and shaft 34.

Fourth speed of operation of the transmission is obtained by de-energizing clutch 12, simultaneously energizing clutch 14, energizing clutch 82, and maintaining clutch 114 engaged whereby power flows by way of clutch 14, output member 40, shaft 50, gear cluster 52, meshing gears 56 and 80, clutch 82, shaft 32, meshing gears 110 and 112, clutch 114, gear 116 and shaft 34.

It is to be noted that throughout the first four forward speeds of operation of the transmission the gear ratio of the auxiliary gear box has remained constant and it is thus only necessary to disengage clutch 114 and simultaneously engage clutch 120 in the auxiliary gear box to obtain forward speeds five through eight of the transmission wherein the same sequence of operation of clutches 12 and 14, and clutches 64, 78, 60 and 82 is had in connection therewith as occured for speeds one through four.

Speeds five to eight and reverse speeds are obtained as set forth in the above-mentioned copending application but need not be described here. The present invention is used for clutches 78 and 82. It might also be used for clutches 60 and 64.

Figure 2:
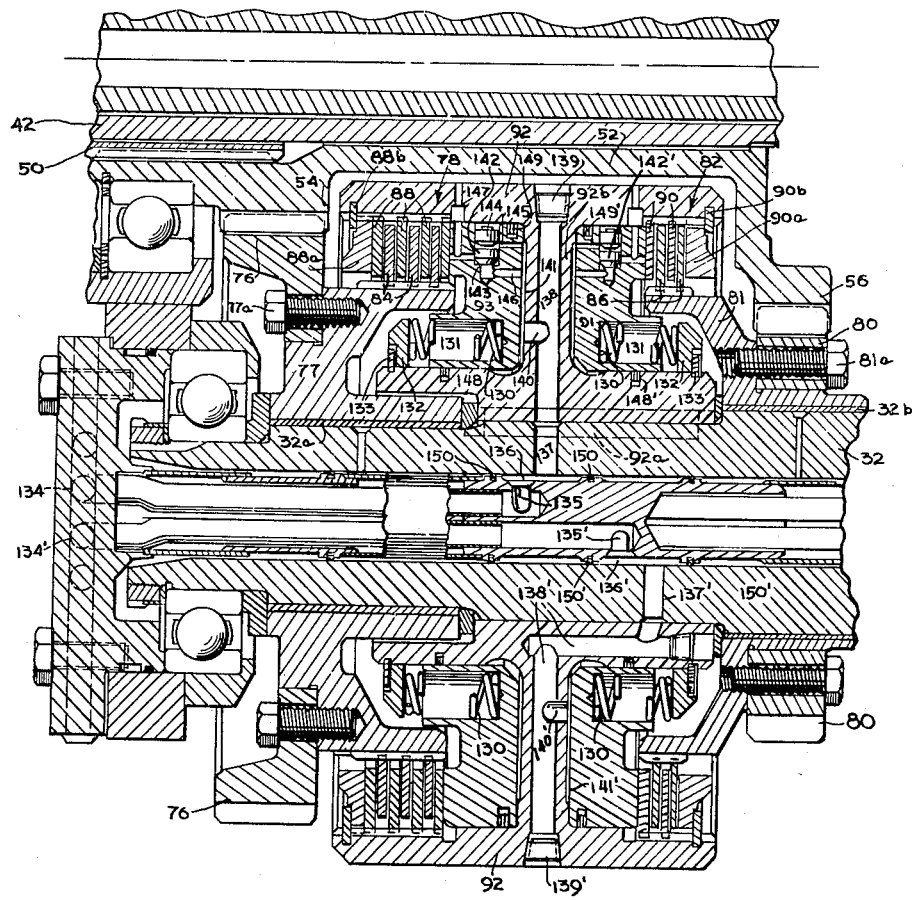

Fig. 2 of the present invention is an enlarged sectional view through that portion of Fig. 1 enclosed in dot-dash lines. This discloses the details of the friction clutches 78 and 82. The friction clutches 60 and 64 are substantially identical with that which will be here described. The friction clutches 104, 114 and 120 are similar to one-half of the present disclosure of Fig. 2, namely, the equivalent of either clutch 78 or clutch 82.

Referring now to Fig. 2, the gear 76 has a hub 77 secured to it by a plurality of bolts 77a. This hub is free to rotate on intermediate shaft 32 on the plain bearing 32a. In like manner the gear 80 has a hub 81 to which the gear is secured by means of a plurality of bolts 81a. This hub is free to rotate on the shaft 32 on the plain bearing 32b. The common support member 92 is keyed to shaft 32 by means of the key 92a. The common support member 92 is provided with two annular cylinders facing in opposite directions from a common central partition wall 92b. In one of these cylinders there is slidingly positioned an annular piston 91. In the other cylinder, facing toward the left in Fig. 2, is slidingly fitted the annular piston 93. The piston 91, when moved toward the right in Fig. 2 in clutch engaging direction, causes driving frictional engagement between the annular plates 86 which are keyed to the hub 81 and the annular plates 90 which are keyed to the common support member 92. An abutment ring 90a held in the member 92 by a snap ring 90b forms an abutment to take the thrust of piston 91. Piston 93 when it moves toward the left as viewed in Fig. 2 in clutch engaging direction, causes driving friction engagement between the set of annular plates 84 keyed to the hub 77 and another set of annular plates 88 keyed to the common support member 92. An abutment ring 88a is held in member 92 by means of snap ring 88b and serves to take the thrust from piston 93 as it moves in clutch engaging direction. A series of helical springs 130 seated in a series of cylindrical pockets 131 in pistons 91 and 93 engage against abutment rings 132 fixed relative to the member 92 by means of snap rings 133 so as to normally urge the pistons 91 and 93 in clutch disengaging direction. One or more drive pins rigid with partition 92b extend snugly but slidably into suitable openings in pistons 91 and 93 so as to permit endwise movement of those pistons while restricting rotation relative to member 92.

Means is provided to supply pressure fluid behind the pistons 91 and 93 to urge them in clutch engaging direction while the parts are rotating. Since these arrangements are almost identical for both pistons 91 and 93, only that for piston 93 will be described in detail. Through the hollow central portion of shaft 32 there extends a pressure fluid conduit 134 which leads through radial passageway 135 to an annular port 136 which communicates with port 137 extending radially outwardly through shaft 32 and joining port 138 which is a passageway extending radially outwardly through member 92 and closed at its outer end by the plug 139. A short passageway 140 communicates between passageway 138 and the chamber 141 behind piston 93 so that pressure fluid in the chamber 141 will cause piston 93 to move toward the left as viewed in Fig. 2 against the urging of springs 130 so as to cause frictional driving engagement between the sets of plates 84 and 88.

The above described friction clutch is the invention of Walter F. Double and is disclosed and claimed in his copending application Serial No. 442,237, filed July 9, 1954 for Friction Clutch Arrangement.

The present invention relates to a free poppet valve 142 which is provided normally coacting with its seat 143 to hold the pressure fluid in chamber 141. This valve is freely slidable in a radially extending cylindrical opening valve bore, or recess 93a of piston or abutment 93, closed at its outer end by plug 144 which is held in place by retainer ring 144a. Passageway 145 provides communication between abutment face 93b of chamber 141 and the radially outermost face 142a of valve 142. Passage 146 provides fluid communication between abutment face 93b of chamber 141 and the radially innermost face 142b of valve 142. A fluid passageway 147 leads radially outwardly through member 92 in registration with passageway 147a in piston 93 to provide free escape of liquid through passages 146, 147a and 147 when poppet valve 142 is open as in Fig. 4, but the discharge passageway is closed when the poppet valve is in its closed position as indicated in Figs. 2 and 3. When the conduit 134 is connected to a source of pressure fluid (not shown) by opening of a valve shown diagrammatically in Fig. 2, and the pump at said source is operating at its normal capacity, the pump pressure and centrifugal force of the column of oil in chamber 141 is applied to both the outer and inner faces of valve 142. Then the pump pressure on the outer valve face is greater than the pump pressure on the inner valve face due to the inner face having a smaller area than that of the outer face. There will also be pressures due to the centrifugal forces of the oil on both outer and inner faces, the centrifugal pressure on the outer face being greater than that on the inner face due to the relative areas of the faces and also due to the outer face being radially outward of the inner face. The net or differential pressure on the outer face of valve 142 is sufficient to overcome the centrifugal force due to the weight of the valve. In one embodiment the force holding valve 142 on its seat is 130 percent of the force tending to open it. However, when the source of pressure fluid is cut off by closing of said valve in conduit 134, then, because the differential pump pressure acting inwardly on valve 142 is cut off, the centrifugal force acting upon the poppet valve 142 is greater than the net pressure fluid forces tending to hold the valve on its seat, and will cause it to move radially outwardly to a position where it opens the passageways 147a, 147 as in Fig. 4, thus allowing the pressure fluid to bleed quickly away from the chamber 141, after which springs 130 will disengage the clutch.

The disclosed construction aids this desired rapid radial outward movement of valve 142. When valve 142 is closed on seat 143 in Fig. 3, radially outer face 142a has a greater area 142c, equal to the cross sectional area of valve bore 93a or valve 142, subjected to fluid pressure through passageways 93a and 145, than the area 142m, equal to the cross sectional area of bore 143a in seat 143, of inner face 142b. However, when the valve 142 leaves seat 143, these areas 142c and 142n in Fig. 4 of faces 142a and 142b are equal and are the same as the cross sectional area of valve 142. Hence, as valve 142 leaves its seat 143, the area of inner face 142b subjected to fluid pressure increases to increase the valve moving force and to assure rapid radial outward movement of valve 142.

The value of this invention is that it provides means for quickly reducing the hydraulic fluid pressure behind the clutch pistons. When the transmission is operating, the clutches may be rotating at high speed. To release the clutch, if no bleed-off means were provided, the oil would have to drain back radially inwardly toward the center of the shaft. This is a slow process, as centrifugal force of the radial column of oil creates pressure tending to keep the clutch piston in clutch engaging position. Sometimes, in the interest of quickly releasing the clutches, hydraulically operated transmissions have provided a small hole through the piston such as 93 here described, which constantly bleeds a small amount of oil from the clutch cavity such as 141 on the side of the piston which urges the clutch into engagement. In the present type of transmission disclosed herein, as many as three clutches may be engaged at one time. In such a case, the use of bleed holes through the clutch pistons would make it necessary to use a larger pump. With the present invention, utilizing the bleed-off valve, no hydraulic fluid is wasted.

Parts for operating piston 91, similar to those already described for piston 93 are given the same reference characters with a prime suffix and include pressure fluid supply conduit 134' (with its associated control valve) leading through shaft 32 to passageway 135', annular port 136' and passages 137', 138' and 140' where the pressure fluid will cause piston 91 to move toward the right as viewed in Fig. 2 so as to engage the clutch. The poppet valve 142' serves to bleed away the pressure fluid when the source 134' is disconnected.

Seals 148 and 149 seal chamber 141 against leakage past piston 93. Seals 148' and 149' serve the same function for piston 91. Seals 150 prevent leakage from port 136 along shaft 132 and seals 150' serve the same function for the port 136'.

What I claim is:

1. In a pressure-fluid-operated clutch having clutch mechanism and a movable abutment in operative connection with said mechanism and in fluid communication with a source of pressure fluid effective upon one face of said abutment to engage said clutch mechanism wherein said movable abutment is rotatable, the combination therewith of a valve and cooperating valve seat mounted for rotation with said abutment, said valve being mounted for generally radial movement from a seated position on its seat to an unseated position away from its seat in response to centrifugal force caused by said rotation, and means including said fluid under source pressure effective to hold said valve in seated position when said abutment is rotating, said means being insufficient where said fluid is shut off from its pressure source to hold said valve in seated position, said abutment having a fluid discharge passageway in communication with said valve and closed and opened respectively by said valve in position on and off its seat, said valve in seated position having radially aligned outer and inner faces in communication with said pressure fluid which is effective against said abutment face, said outer face having an area acted upon by said pressure fluid sufficiently greater than the area of said inner face subjected to pressure fluid in valve seated position to overcome the effect of centrifugal force acting radially outwardly on said valve when said abutment is rotating and said fluid is under pressure from its source.

2. In a clutch structure comprising a shaft, an output member surrounding said shaft and drivingly engaged therewith, a gear rotatably mounted in said shaft, there being a cylinder chamber formed in said output member, piston means reciprocatably mounted in said chamber, clutch elements drivingly connected with said gear and said output member respectively, said elements mounted for movement into and out of driving engagement with each other, and said elements operatively associated with said piston means for control of their driving engagement by said piston means; the combination therewith of means for reciprocating said piston means including means for admitting or cutting off flow of hydraulic fluid from a pressure source into said cylinder chamber, said piston means having a passageway through its periphery and communicating with said chamber, and a poppet valve having a radially outer face and coacting valve seat in said passageway for controlling flow therethrough, said piston means having a recess extending generally radially thereof and snugly embracing said valve for reciprocation in said recess into and out of engagement with its seat located radially inwardly therefrom, said output member having a fluid discharge passageway in register with said first named passageway, said piston means having a third passageway communicating between said chamber and the radially outer face of said valve, the parts being so constructed and arranged that the differential fluid pressure exerted against the outer faces of said valve through said third passageway is sufficient to hold said valve on its seat only when said piston reciprocating means admits flow of hydraulic fluid from said source and that said fluid pressure force against said outer face overcomes the fluid pressure force exerted on the inner face of said valve through said first mentioned passageway and overcomes the centrifugal force on said poppet valve.

3. In a pressure-fluid-operated clutch having clutch mechanism and a movable abutment in operative connection with said mechanism and in fluid communication with a source of pressure fluid effective upon one face of said abutment to engage said clutch mechanism wherein said movable abutment is rotatable, the combination therewith of a valve having a valve seat engaging portion and of a cooperating valve seat located radially inwardly along a radial line from said valve seat engaging portion with said valve and valve seat being mounted for rotation with said abutment, said valve seat and valve seat engaging portion each surrounding said radial line, said valve being mounted for generally radial movement outwardly along said line away from its seat responsive to centrifugal force caused by said rotation, and means including said fluid under source pressure effective to hold said valve on its seat when said abutment is rotating, said means being insufficient where said fluid is shut off from its pressure source to hold said valve on its seat, said abutment having a fluid discharge passageway in communication with said valve and closed and opened respectively by said valve in position on and off its seat.

4. The combination of claim 3 wherein said valve on its seat has radially outer and inner faces in communication with said pressure fluid which is effective against said abutment face, said outer face having an area acted upon by said pressure fluid sufficiently greater than the area of said inner face and subjected to pressure fluid in valve seated position to overcome the effect of centrifugal force acting radially outwardly on said valve when said abutment is rotating and said fluid is under pressure from its source and when said valve is on its seat, whereby the net closing force of said valve against its seat is the differential force acting on said faces and valve opening will take place quickly.

5. In a pressure-fluid-operated clutch having clutch mechanism and a movable abutment in operative connection with said mechanism and in fluid communication with a source of pressure fluid effective upon one face of said abutment to engage said clutch mechanism wherein said movable abutment is rotatable, the combination therewith of said abutment having a first passageway from said one abutment face to the atmosphere and having a second passageway from said one abutment face to a junction with said first passageway intermediate its ends, said second passageway including a radially extending valve bore and including a valve seat at said junction, a valve mounted for radial movement in said valve bore for movement outwardly away from its seat responsive to centrifugal force caused by rotation or inwardly against its seat to cut off flow through said first passageway, said valve having radially outer and inner faces with the outer face of said valve subjected to fluid pressure through said second passageway being of greater area than a first inner face area of said valve subjected to fluid pressure through said first passageway in valve seated position against said valve seat but of equal area to a second inner face area exposed to the fluid in said first passageway when said valve is off its seat, means for shutting off or applying pressure from said source to fluid acting against said one abutment face and through said passageways with the fluid during pressure application being effective to hold against the centrifugal force said valve inwardly against its seat by the differential force on said outer face area and said first inner face area when said abutment is rotating to prevent fluid exhaust to the atmosphere through said first passageway and with the fluid during pressure shut-off being ineffective to hold said valve closed against the centrifugal force so that said valve moves radially outwardly to an unseated position and said fluid exhausts through said first passageway with said fluid impinging against said second inner face area during exhaust to provide fast valve opening action.

References Cited in the file of this patent

UNITED STATES PATENTS

| | | |
|---|---|---|
| 2,297,480 | Kratzmann | Sept. 29, 1942 |
| 2,712,140 | Curtis | July 5, 1955 |
| 2,723,567 | Double et al. | Nov. 15, 1955 |
| 2,740,512 | Fischer | Apr. 3, 1956 |

FOREIGN PATENTS

| | | |
|---|---|---|
| 402,912 | Germany | Sept. 24, 1924 |
| 977,041 | France | Nov. 8, 1950 |